(12) United States Patent
Chen et al.

(10) Patent No.: US 9,341,878 B2
(45) Date of Patent: May 17, 2016

(54) DISPLAYS WITH LOW REFLECTANCE BORDER REGIONS

(75) Inventors: Cheng Chen, San Jose, CA (US); Young Cheol Yang, Sunnyvale, CA (US); Young Bae Park, San Jose, CA (US)

(73) Assignee: Apple Inc., Cupertino, CA (US)

( * ) Notice: Subject to any disclaimer, the term of this patent is extended or adjusted under 35 U.S.C. 154(b) by 265 days.

(21) Appl. No.: 13/607,368

(22) Filed: Sep. 7, 2012

(65) Prior Publication Data

US 2013/0265521 A1    Oct. 10, 2013

Related U.S. Application Data

(60) Provisional application No. 61/620,933, filed on Apr. 5, 2012.

(51) Int. Cl.
*G02F 1/1335* (2006.01)
*G02F 1/1333* (2006.01)

(52) U.S. Cl.
CPC .... *G02F 1/133502* (2013.01); *G02F 1/133512* (2013.01); *G02F 1/133514* (2013.01); *G02F 1/133516* (2013.01); *G02F 2001/133388* (2013.01); *G02F 2001/133565* (2013.01)

(58) Field of Classification Search
CPC ................................................ G02F 1/133502
USPC ......................................................... 349/106
See application file for complete search history.

(56) References Cited

U.S. PATENT DOCUMENTS

| | | | |
|---|---|---|---|
| 5,365,357 A | 11/1994 | Ohgawara et al. | |
| 5,936,694 A * | 8/1999 | Suzuki | G02F 1/133345 349/108 |
| 7,167,221 B2 | 1/2007 | Yeh et al. | |
| 7,180,568 B2 | 2/2007 | Lee et al. | |
| 7,626,658 B2 | 12/2009 | Lee et al. | |
| 2002/0075429 A1* | 6/2002 | Fujioka | G02F 1/133514 349/106 |
| 2004/0169794 A1* | 9/2004 | Kim | 349/106 |
| 2004/0233375 A1* | 11/2004 | Chung et al. | 349/153 |
| 2005/0206797 A1* | 9/2005 | Yamazaki et al. | 349/44 |
| 2009/0208853 A1 | 8/2009 | Sakamoto | |
| 2009/0213316 A1* | 8/2009 | Yoshida | 349/155 |
| 2010/0149463 A1 | 6/2010 | Shimizu et al. | |
| 2010/0297365 A1 | 11/2010 | Curd | |

FOREIGN PATENT DOCUMENTS

EP          1898256          6/2012

* cited by examiner

*Primary Examiner* — Michael Caley
*Assistant Examiner* — Edmond Lau
(74) *Attorney, Agent, or Firm* — Treyz Law Group, P.C.; Joseph F. Guihan

(57) ABSTRACT

An electronic device may have a display such as a liquid crystal display. A color filter layer may be formed on a display layer such as a transparent substrate layer of the display. The color filter layer may include an array of color filter elements on an inner surface of the transparent substrate layer. The color filter layer may include opaque masking material. In an inactive portion of the display, the opaque masking material may be formed over the color filter elements and interposed between the color filter elements. In the inactive portion of the display, the opaque masking material and the color filter elements may form a ring that serves as a border region surrounding an active portion of the display. In the active portion of the display, the opaque masking layer may be patterned to from an opaque matrix that separates the color filter elements.

22 Claims, 12 Drawing Sheets

DISPLAYS WITH LOW REFLECTANCE BORDER REGIONS

This application claims the benefit of provisional patent application No. 61/620,933, filed Apr. 5, 2012, which is hereby incorporated by reference herein in its entirety.

BACKGROUND

This relates generally to electronic devices and, more particularly, to electronic devices with displays.

Electronic devices such as computers and cellular telephones may have displays. In a typical display such as a liquid crystal display, an array of display pixels is used to display images for a user. The array of display pixels may be formed in an active display region of the display. The display may also include a peripheral border region that is inactive.

To provide a display such as a liquid crystal display with the ability to display color images, an array of color filter elements is often aligned with the array of display pixels. The color filter layer may be formed on an outer glass layer of the display. A typical color filter array often contains red, blue, and green color filter elements (e.g., elements that pass red, blue, and green light respectively) that are separated from each other by a patterned black masking layer. Portions of the black masking layer are also sometimes formed on the outer glass layer of the display in the inactive area around the periphery of the color filter array.

At the interface of an outer glass layer and other display components such as color filter elements and black masking layers, reflections of ambient light may arise. These reflections are caused by differences in the indices of refraction of the outer glass layer, the color filter elements and the black masking layer. Because the black masking layer and the color filter elements have different indices of refraction, these reflections at the inner surface of the outer glass layer can make the inactive peripheral region of the display stand out in contrast to the active portion of the display. With traditional display designs, it can be challenging to reduce reflections.

It would therefore be desirable to be able to provide electronic devices with improved displays such as electronic devices with minimized display reflections.

SUMMARY

An electronic device may have a display such as a liquid crystal display. The display may have multiple layers of material such as a display substrate, a color filter layer and a thin-film transistor layer. A layer of liquid crystal material may be interposed between the color filter layer and the thin-film transistor layer.

The color filter layer may be formed on an inner surface of the display substrate. The display substrate may be formed from a transparent rigid material such as glass or plastic.

An opaque masking layer may be formed on a display layer such as the color filter layer. The display may have a central active area such as a rectangular active area. Display pixels in the active area may present images to a user of the electronic device. The active area may be surrounded by an inactive area. For example, the active area may be surrounded by an inactive area that has the shape of a rectangular ring.

In the inactive portion of the display, the opaque masking layer may be formed over color filter elements to form a rectangular border that surrounds the active area. The color filter elements may be interposed between the opaque masking layer and the substrate layer in the inactive area.

Reflections may be reduced within the inactive border region of the display by forming the color filter elements interposed between the opaque masking layer and the substrate layer in the inactive border region.

During manufacturing of the display, display layers such as color filter layers, opaque masking layers, liquid crystal layers and other layers may be formed on a sheet of substrate layer material such as a sheet of glass. Alignment marks may be formed on the sheet of glass. Manufacturing equipment such as deposition equipment and patterning equipment may be used to deposit and pattern display materials such as color filter material, opaque masking material, planarization material, polarizing material, or other material on the sheet of glass.

The manufacturing equipment may use the alignment marks to determine where to deposit and pattern the display materials on the sheet of glass. The alignment marks may be formed from materials such as metal or color filter material. The alignment marks may be formed on the sheet of glass before forming color filter elements on the sheet of glass or may be patterned on the sheet of glass as a part of a color filter patterning process.

Further features of the invention, its nature and various advantages will be more apparent from the accompanying drawings and the following detailed description of the preferred embodiments.

DETAILED DESCRIPTION

Figure 1:
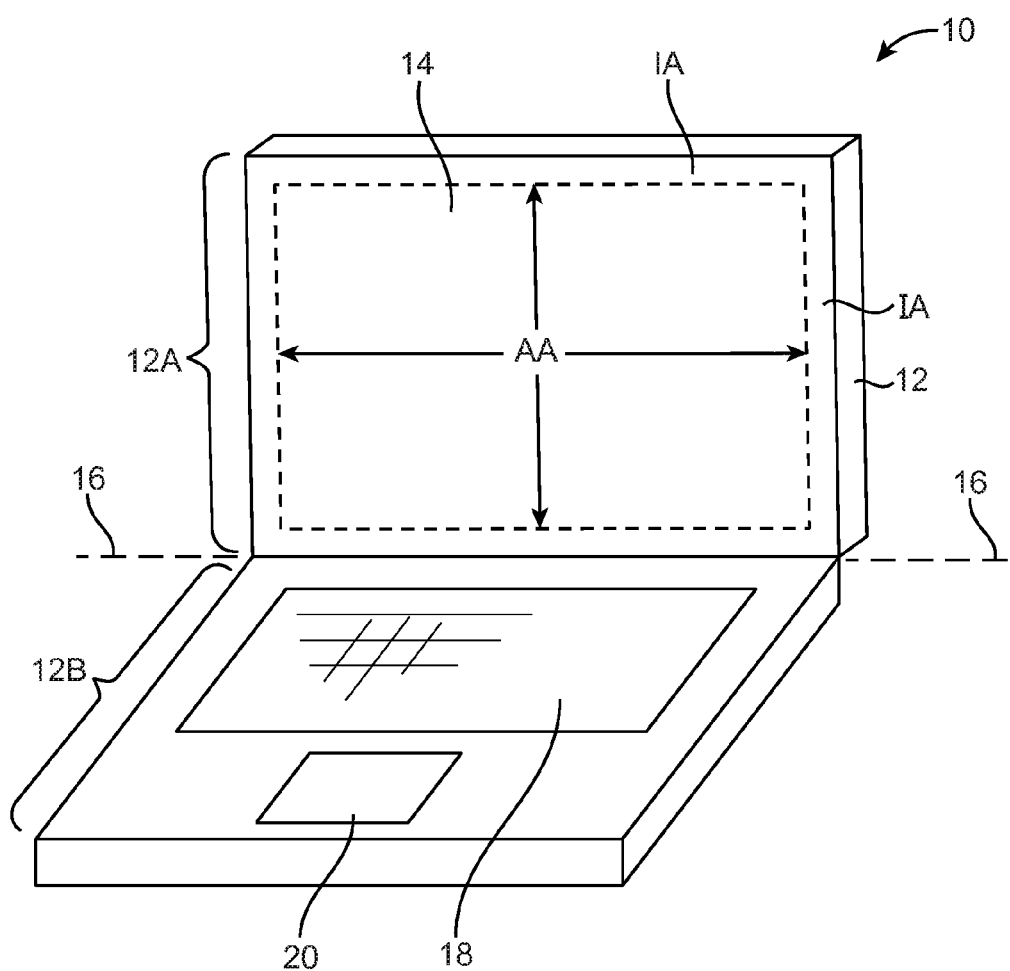
FIG. 1 is a diagram of an illustrative electronic device with a display such as a portable computer in accordance with an embodiment of the present invention.

An illustrative electronic device of the type that may be provided with a display is shown in FIG. 1. Electronic device 10 may be a computer such as a computer that is integrated into a display such as a computer monitor, a laptop computer, a tablet computer, a somewhat smaller portable device such as a wrist-watch device, pendant device, or other wearable or miniature device, a cellular telephone, a media player, a tablet computer, a gaming device, a navigation device, a computer monitor, a television, or other electronic equipment.

As shown in FIG. 1, device 10 may include a display such as display 14. Display 14 may be a touch screen that incorporates capacitive touch electrodes or other touch sensor components or may be a display that is not touch sensitive. Display 14 may include image pixels formed from liquid crystal display (LCD) components or other suitable display pixel structures. Arrangements in which display 14 is formed using liquid crystal display pixels are sometimes described herein as an example. This is, however, merely illustrative. Any suitable type of display technology may be used in forming display 14 if desired.

Device 10 may have a housing such as housing 12. Housing 12, which may sometimes be referred to as a case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

As shown in FIG. 1, housing 12 may have multiple parts. For example, housing 12 may have upper portion 12A and lower portion 12B. Upper portion 12A may be coupled to lower portion 12B using a hinge that allows portion 12A to rotate about rotational axis 16 relative to portion 12B. A keyboard such as keyboard 18 and a touch pad such as touch pad 20 may be mounted in housing portion 12B.

Display 14 may have an active area such as active area AA and an inactive area such as area IA. Active area AA may be, for example, a rectangular region in the center of display 14 in which display pixels are actively used to display images for a user of device 10. Inactive area IA may be devoid of active display pixels. In the example of FIG. 1, inactive area IA has the shape of a rectangular ring, surrounding the periphery of active area AA of display 14. Circuitry and other components may sometimes be formed in inactive area IA. To hide the circuitry and other components from view by a user of device 10, inactive area IA may sometimes be provided with an opaque mask. The opaque mask may be formed over transparent color filter elements in inactive area IA. The opaque mask can be formed from an opaque material such as a black material or may be formed from opaque masking materials of other colors. Configurations in which the opaque masking material in display 14 has a black appearance are sometimes described herein as an example. This is, however, merely illustrative. Opaque masking layers in device 10 may have any suitable colors.

Figure 2:
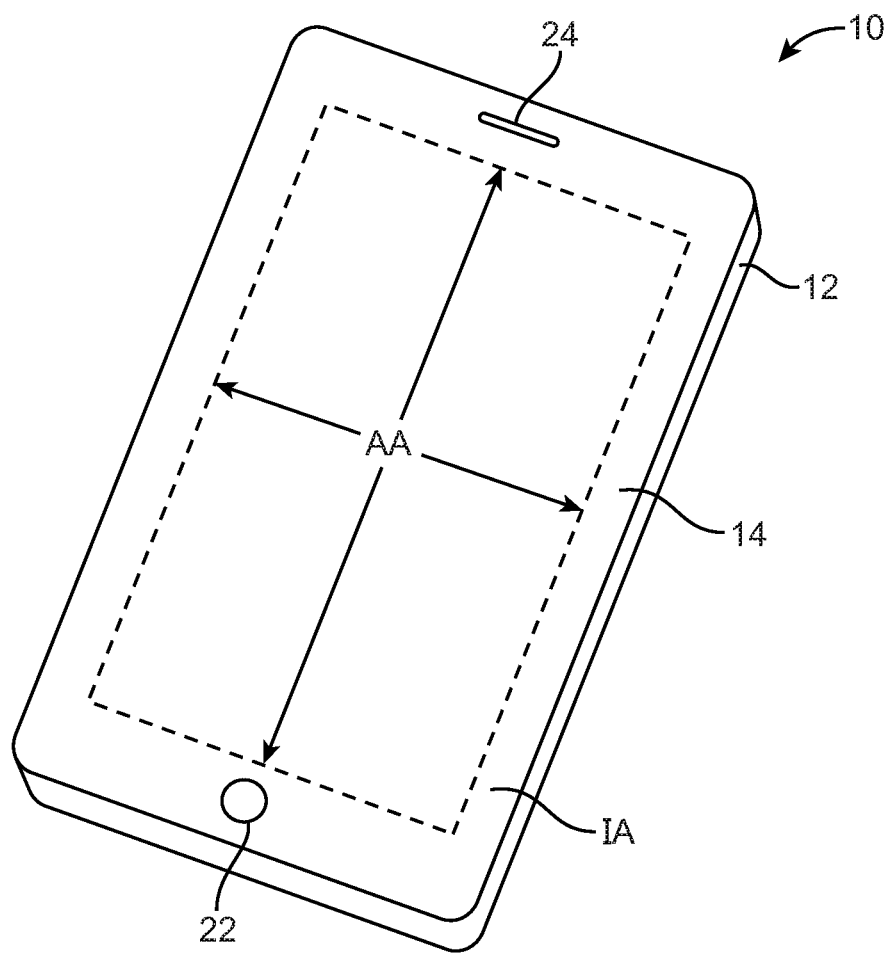
FIG. 2 is a diagram of an illustrative electronic device with a display such as a cellular telephone or other handheld device in accordance with an embodiment of the present invention.

In the example of FIG. 2, device 10 has been implemented using a housing that is sufficiently small to fit within a user's hand (i.e., device 10 of FIG. 2 may be a handheld electronic device such as a cellular telephone). As show in FIG. 2, device 10 may include a display such as display 14 mounted on the front of housing 12. Display 14 may be substantially filled with active display pixels or may have an inactive portion such as inactive portion IA that surrounds an active portion such as active portion AA. Display 14 may have openings (e.g., openings in inactive region IA or active region AA of display 14) such as an opening to accommodate button 22 and an opening to accommodate speaker port 24.

Figure 3:
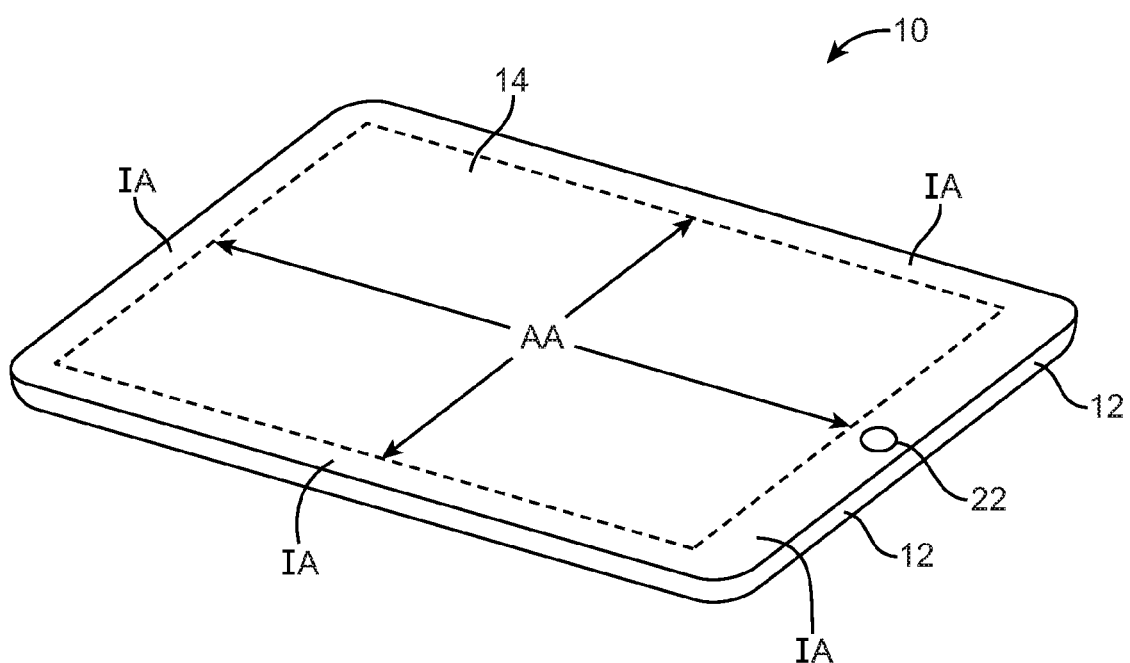
FIG. 3 is a diagram of an illustrative electronic device with a display such as a tablet computer in accordance with an embodiment of the present invention.

FIG. 3 is a perspective view of electronic device 10 in a configuration in which electronic device 10 has been implemented in the form of a tablet computer. As shown in FIG. 3, display 14 may be mounted on the upper (front) surface of housing 12. An opening may be formed in display 14 to accommodate button 22 (e.g., in inactive region IA surrounding active region AA).

Figure 4:
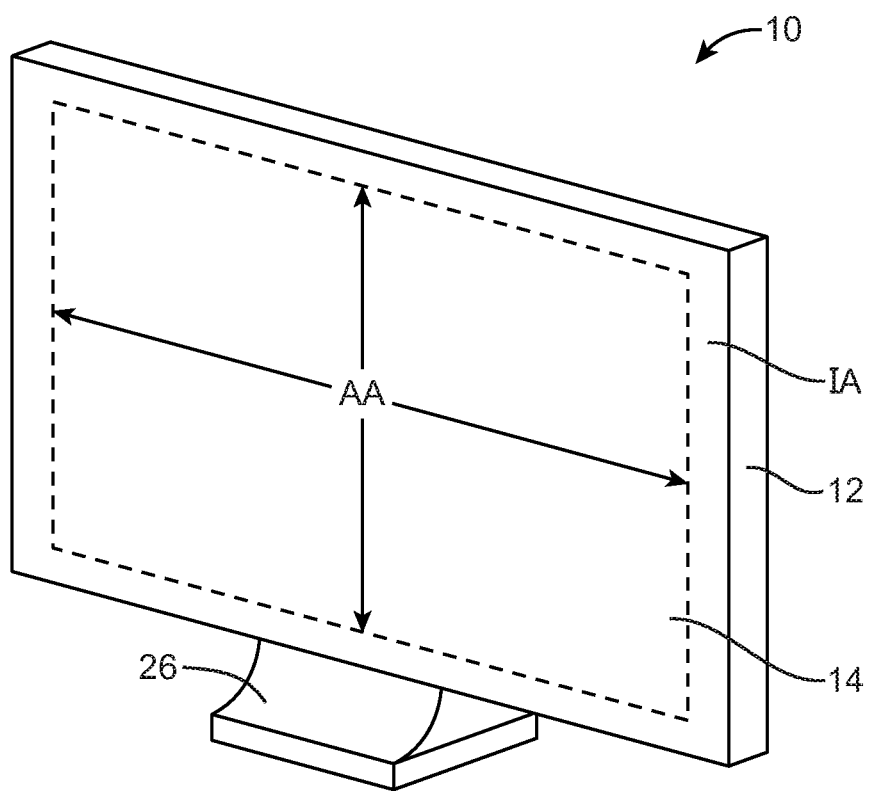
FIG. 4 is a diagram of an illustrative electronic device with a display such as a computer monitor with a built-in computer in accordance with an embodiment of the present invention.

FIG. 4 is a perspective view of electronic device 10 in a configuration in which electronic device 10 has been implemented in the form of a computer integrated into a computer monitor. As shown in FIG. 4, display 14 may be mounted on the front surface of housing 12. Stand 26 may be used to support housing 12. Display 14 may include an inactive region such as inactive region IA that surrounds active region AA.

If desired, display 14 may be configured so as to minimize or eliminate the size of inactive region IA along one or more edges of active region AA. Configurations in which inactive region IA extends along all four edges of a rectangular active region AA are described herein as an example.

Figure 5:
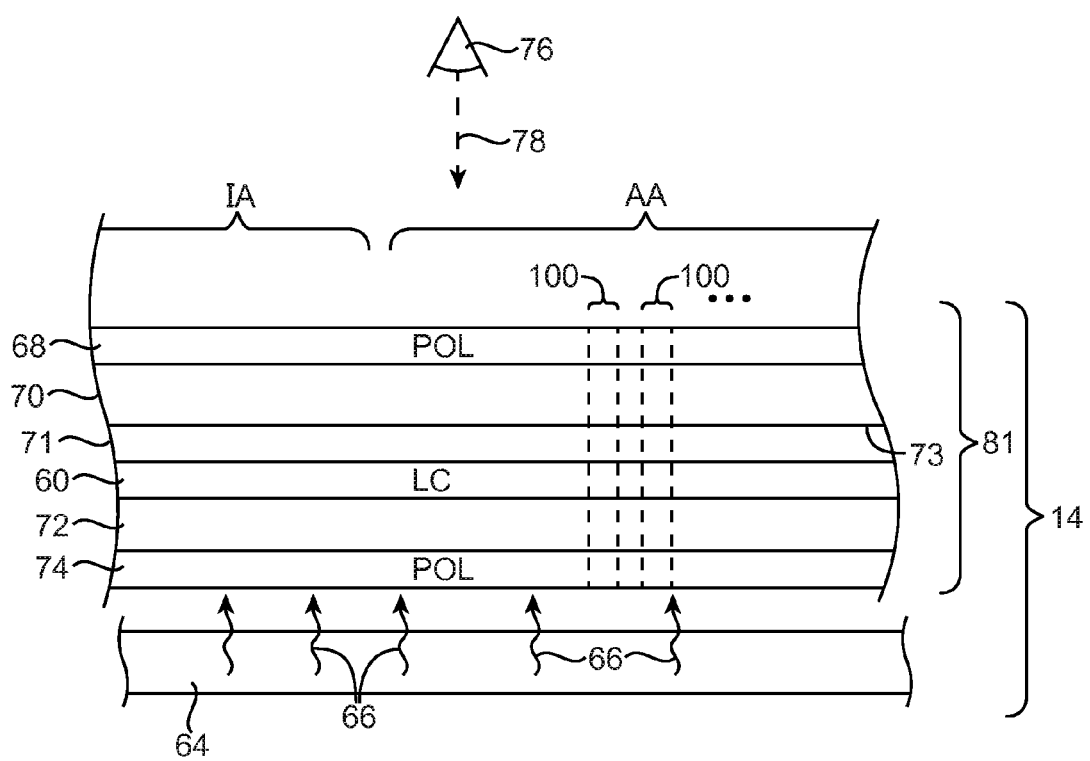
FIG. 5 is a cross-sectional side view of a portion of an illustrative liquid crystal display in accordance with an embodiment of the present invention.

Display 14 may be, for example, a liquid crystal display such as display 14 of FIG. 5. As shown in FIG. 5, backlight structures 64 may be used to produce backlight 66 that travels upwards (outwards) in dimension Z through display layers 81 of display 14. Display layers 81 may include an upper polarizer layer such as layer 68 and a lower polarizer layer 74. Upper polarizer layer 68 may be attached to one or more substrate layers such as display substrate 70. Lower polarizer layer 74 may be attached to one or more substrate layers such as thin-film-transistor layer 72. Layers 70 and/or 72 may be formed from transparent substrates such as glass, plastic, or other materials. During manufacturing of displays such as display 14, layers such as layers 70 or 72 of an individual display may be cut from a sheet of transparent substrate such as a sheet of glass. Display substrate 70 may be known as a display layer or display color filter glass.

Display 14 may have additional display layers such as layer 71 formed on interior surface 73 of layer 70. Layer 71 may include color filter layers, planarization layers, opaque masking patterns, layers that include color filter elements and opaque masking material, clear layers, or other suitable display layers. For example, color filter elements may be formed on interior surface 73 of substrate 70 and opaque masking material may be formed over and/or between the color filter elements on interior surface 73.

Layer 72 of display 14 may include thin-film transistor layers, color filter layers, layers that include thin-film transistor structures and color filter elements, planarization layers, opaque masking patterns, clear layers, or other suitable display layers.

An array of electrodes may be controlled by the thin-film transistor circuitry in a thin-film transistor layer in display 14.

Thin-film transistor circuitry may include, as examples, amorphous silicon transistor circuitry or polysilicon transistor circuitry. Thin film transistor circuitry may also include interconnect lines to connect electrodes formed from conductive materials such as indium tin oxide and metal to thin-film structures such as thin-film transistors. Thin-file transistor circuitry may be used in adjusting voltages in display pixels 100 in active area AA, thereby selectively lightening and darkening pixels 100 and presenting an image to a user of device 10 such as viewer 76, viewing display 14 in direction 78.

As light 66 passes through lower polarizer 74, lower polarizer 74 polarizes light 66. As polarized light 66 passes through liquid crystal material 60, liquid crystal material 60 may rotate the polarization of light 66 by an amount that is proportional to the electric field through liquid crystal material 60. If the polarization of light 66 is aligned in parallel with the polarization of polarizer 68 in a given display pixel 100, the transmission of light 66 through layer 68 in that pixel will be maximized. If the polarization of light 66 is aligned so as to run perpendicular to the polarization of polarizer 68 in a given pixel 100, the transmission of light 66 through layer 68 will be minimized (i.e., light 66 will be blocked) in that pixel.

Backlight unit 28 may include a light source such as a light-emitting diode array for producing backlight 66. Polarizers such as polarizer 68 and polarizer 74 may be formed from thin polymer films. For example, polarizer 68 may be formed from polymer film and an associated adhesive layer such as optically clear adhesive layer.

If desired, display 14 may be provided with layers for reducing fingerprints (e.g., a smudge-resistant coating in a touch-sensitive display), anti-scratch coatings, an antireflection coating, a layer for reducing the impact of static electricity such as an indium tin oxide electrostatic discharge protection layer, or other layers of material. The display layers that are used in the configuration of FIG. 5 are merely illustrative.

Figure 6:
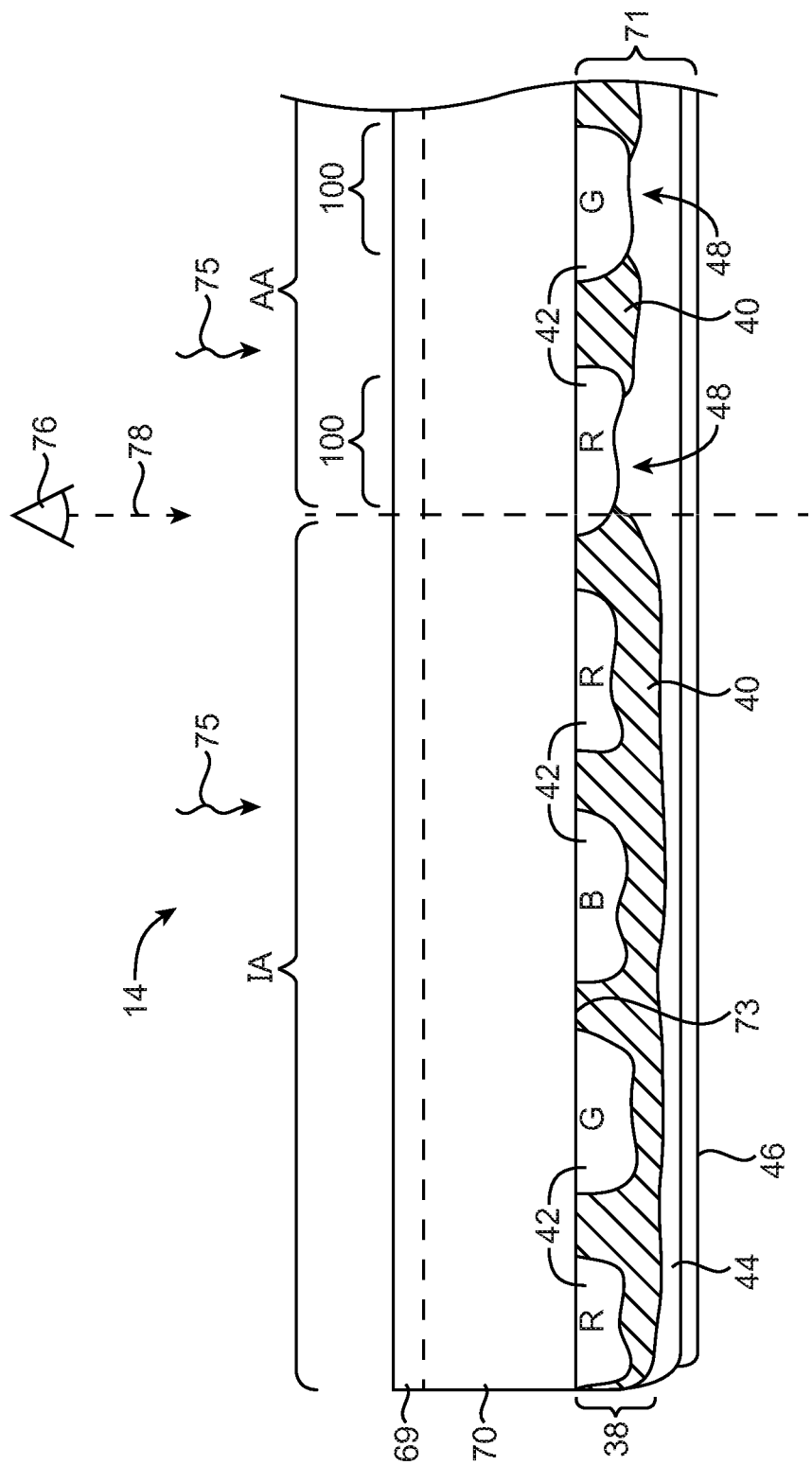
FIG. 6 is cross-sectional side view of a portion of a display having an opaque masking layer over color filter elements in an inactive border region in accordance with an embodiment of the present invention.

As shown in FIG. 6, layer 71 on interior surface 73 of substrate 70 of display 14 may include a display layer such as color filter layer 38. Color filter layer 38 may include an array of color filter elements 42 and opaque masking material 40. Color filter layer 38 may be covered by a planarization layer such as planarization layer 44.

Planarization layer 44 may be formed from a layer of silicon oxide, silicon nitride, silicon oxynitride, an organic material such as acrylic, other transparent planarizing materials, or a combination of two or more of these materials. If desired, layer 44 may be polished to help planarize layer 44. If desired, planarization layer 44 may be covered by a relatively thin polymer layer such as polymer layer 46. Polymer layer 46 may be formed from polymer material such as polyimide. Liquid crystal material (see, e.g., FIG. 5) of display 14 may be interposed between polymer layer 46 and a thin-film-transistor layer such as layer 72.

Color filter layer 38 may include an array of color filter elements 42 formed on inner surface 73 of substrate 70. Color filter elements 42 may include, for example, red elements R, green elements G, and blue elements B. The array of color filter elements in color filter layer 38 may be used to provide display 14 with the ability to display color images.

Adjacent color filter elements 42 may be separated by intervening portions of opaque masking material 40. Opaque masking material may be formed from a dark substance such as a polymer that contains a black pigment and is therefore sometimes referred to as a black mask, black masking layer, black pigmented layer, or black masking material. Illustrative polymeric materials for forming black masking layer 40 include acrylic-based and polyimide-based photoresists. An illustrative black pigment that may be used for black masking layer 40 is amorphous carbon (e.g., carbon black).

In active region AA, portions of color filter elements 42 that are aligned with display pixels 100 may be free of black mask 40 so that light such as backlight 66 (FIG. 5) may pass through color filter layer 38. Black mask 40 may form a grid of relatively thin lines (sometimes referred to as a black matrix) in active region AA that visually separates individual display pixels 100.

The black matrix may have a pattern of openings 48 aligned with pixels 100 in active area AA. Openings 48 may form an array of rectangular holes in which color filter elements 42 are formed. In inactive region IA, black masking material 40 and color filter elements 42 may be used in forming a peripheral opaque mask that serves as an opaque border for display 14. The opaque mask in inactive area IA may have a rectangular ring shape that surrounds a central rectangular active area AA (as an example). If desired, active area AA may have other shapes such as a chevron shape.

Light such as ambient light 75 may reflect from the interfaces of the layers in display 14, leading to the potential for undesired reflections. Light reflections in inactive region IA may be reduced by forming color filter elements 42 interposed between opaque masking material 40 and inner surface 73 of substrate 70 in inactive portion IA.

Because the index of refraction of the combination of black masking material 40 over color filter elements 42 on surface 73 may be configured to be similar to the index of refraction of black masking material 40 interposed between color filter elements 42, display 14 may appear to a viewer 76 viewing display 14 in direction 78 as a seamless display without a visible border between active area AA and inactive area IA. Color filter layer 38 may, for example, be configured (e.g., by adjusting the aperture ratios of color filter elements 42) to have an index of refraction in inactive region IA and an index of refraction in active region AA that are near enough to equal to provide an inactive region IA that is visually indistinguishable from active region AA when display pixels 100 are turned off.

As shown in FIG. 6, display 14 may include layers such as layer 69 on an outer surface of substrate 70. Layer 69 may include one or more layers such as polarization layer (FIG. 5), layers for reducing fingerprints (e.g., a smudge-resistant coating in a touch-sensitive display), anti-scratch coatings, an antireflection coating, a layer for reducing the impact of static electricity such as an indium tin oxide electrostatic discharge protection layer, or other layers of material.

Layers of material such as color filter material (e.g., red color filter material, green color filter material, and blue color filter material) may be deposited on substrate 70 by screen printing, spin-on coating, spray coating, physical vapor deposition, chemical vapor deposition, or other suitable deposition techniques.

Color filter elements 42 of each color (e.g., red R, green G, and blue G) may be formed by depositing color filter material of that color on inner surface 73 (and over any previously deposited and/or patterned materials) and etching or otherwise patterning (e.g., using photolithographic equipment) the color filter material of that color to form the color filter elements.

During manufacturing of display 14, opaque masking material 40 may be deposited over substantially all of color filter elements 42 in active region AA and inactive region IA. The opaque masking material that has been deposited may be patterned (e.g., etched or otherwise patterned) to remove the opaque masking material from the color filter elements in active region AA to form openings 48 over color filter elements 42 so that light may pass through color filter elements 42 and substrate 70.

As shown in FIG. 6, in inactive area IA of display 14, color filter elements 42 may be attached to inner surface 73 of substrate 70 and opaque masking material 40 may be formed over and interposed between color filter elements 42. In active area AA of display 14, color filter elements 42 may be attached to inner surface 73 of substrate 70 and opaque masking material may be interposed between color filter elements 42 and formed over portions of color filter elements 42 with openings 48 over other portions of color filter elements 42. If desired, other types of material may be interposed between opaque masking material 40 and inner surface 73 of substrate 70 in inactive region IA. The arrangement of FIG. 6 is merely illustrative.

Figure 7:
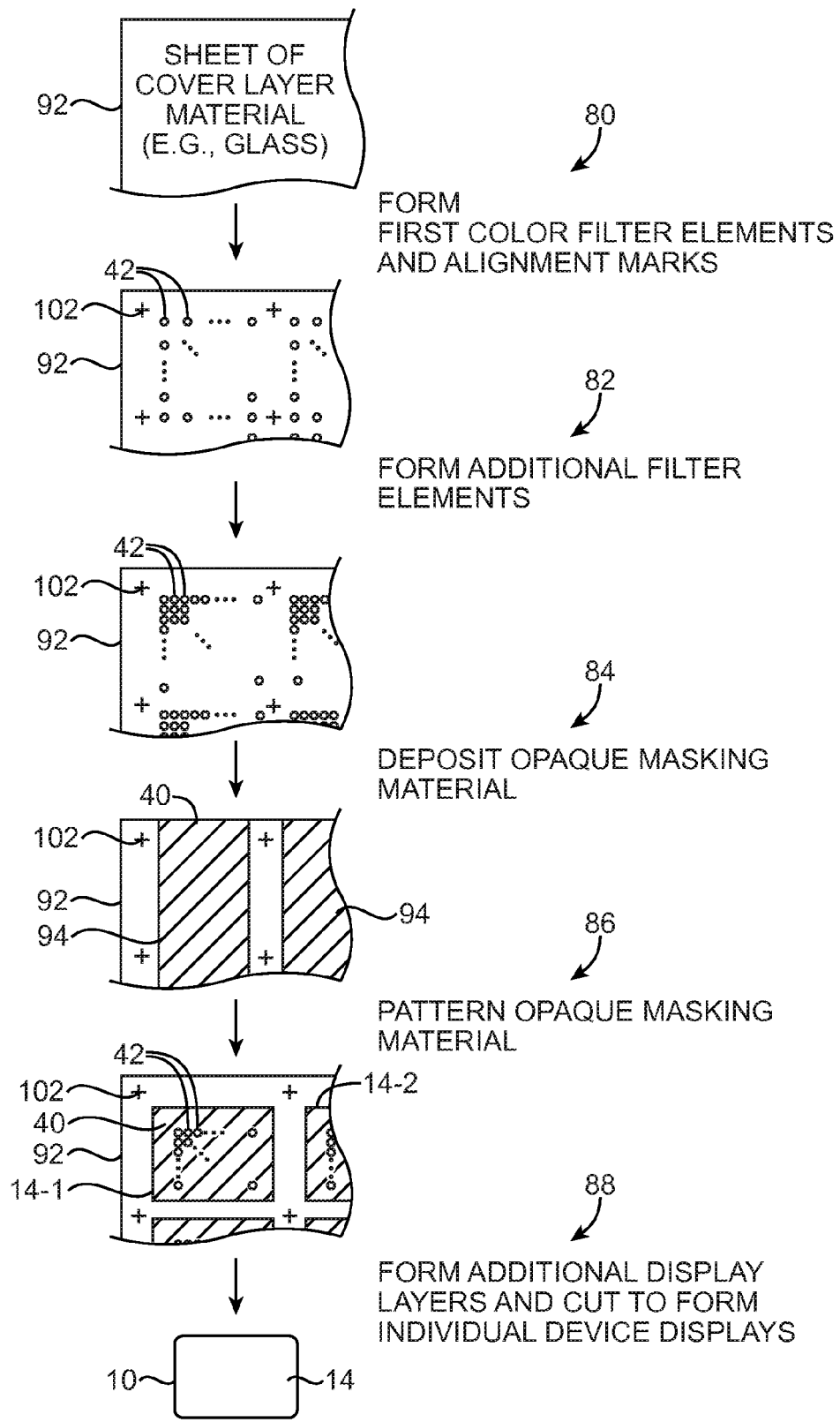
FIG. 7 is a flow chart of illustrative steps involved in forming color filter elements, alignment marks and opaque masking layers on a sheet of cover layer material for forming device displays of the type shown in FIG. 6 in accordance with an embodiment of the present invention.

Illustrative steps that may be used in forming a display having display layers of the type shown in FIG. 6 are shown in FIG. 7.

At step 80, color filter elements and alignment marks may be formed on a blank sheet of substrate material such as glass sheet 92 using color filter material having a first color (e.g., blue color filter material).

Color filter elements 42 and alignment marks 102 may be formed from the color filter material having the first color by depositing the color filter material having the first color on substantially all of a first surface of sheet 92 and etching or otherwise removing portions of the color filter material having the first color to form (e.g., blue) color filter elements and (e.g., blue) alignment marks on sheet 92.

Alignment marks 102 may be used by equipment such as patterning and deposition equipment in forming additional display structures (e.g., additional color filter elements, opaque masking layers or other display structures) on sheet 92 and/or in cutting portions of sheet 92 to form multiple individual displays 14 for individual devices 10.

At step 82, additional color filter elements such as red color filter elements and green color filter elements may be formed on sheet 92. Following formation of additional color filter elements 42 on sheet 92, sheet 92 may have a multiplicity of color filter arrays for a corresponding multiplicity of displays 14 that are marked off by alignment marks 102.

Color filter elements 42 of each color may be formed by coating substrate 92 with color filter material, soft baking the color filter material, applying a patterned guide to the soft baked color filter material, exposing the color filter material to light, and hard baking the patterned color filter material. However, this is merely illustrative, if desired, color filter elements may be formed using any suitable deposition and patterning methods.

At step 84, opaque masking material 40 may be deposited over the color filter elements 42. As shown in FIG. 7, opaque masking material 40 may be deposited (e.g., using slot coating equipment) in continuous strips 94 of opaque masking material that cover color filter elements to be used for multiple device displays.

At step 86, continuous strips 94 of opaque masking material 40 may be patterned (e.g., using patterning equipment such as photolithography equipment) using alignment marks 102 to form separate black masks for separate displays and to remove opaque masking material 40 from color filter elements 42 in regions of sheet 92 to be used for active areas AA of each display (e.g., active areas of display 14-1, active areas of display 14-2, etc.).

As shown in FIG. 7, each portion of sheet 92 to be used for a display (e.g., display 14-1, 14-2, etc.) may include uncovered color filter elements 42 and an interposed black matrix in a central portion (e.g., a portion to be used as an active area AA of a display) and opaque masking material over color filter elements in a rectangular ring around the uncovered color filter elements 42 (e.g., in a portion of sheet 92 to be used as an inactive border region IA for that display).

At step 88, additional display layers (e.g., planarization layers, polymer layers such as polyimide layers, liquid crystal layers, thin-film transistor layers, additional substrate layers such as additional glass layers, adhesive layers and other additional display layers) may be formed over patterned opaque masking material 40 and color filter elements 42 using alignment marks 102. Portions of sheet 92 and associated display layers may then be cut to form multiple individual displays 14 having display layers of the type shown in FIG. 6 for corresponding individual devices 10.

The deposition and patterning steps of FIG. 7 are, however, merely illustrative. If desired, a display having an inactive border region with opaque masking material formed over color filter elements (e.g., a display having color filter elements interposed between an opaque masking layer and a transparent substrate in an inactive region) may be formed using other methods.

Figure 8:
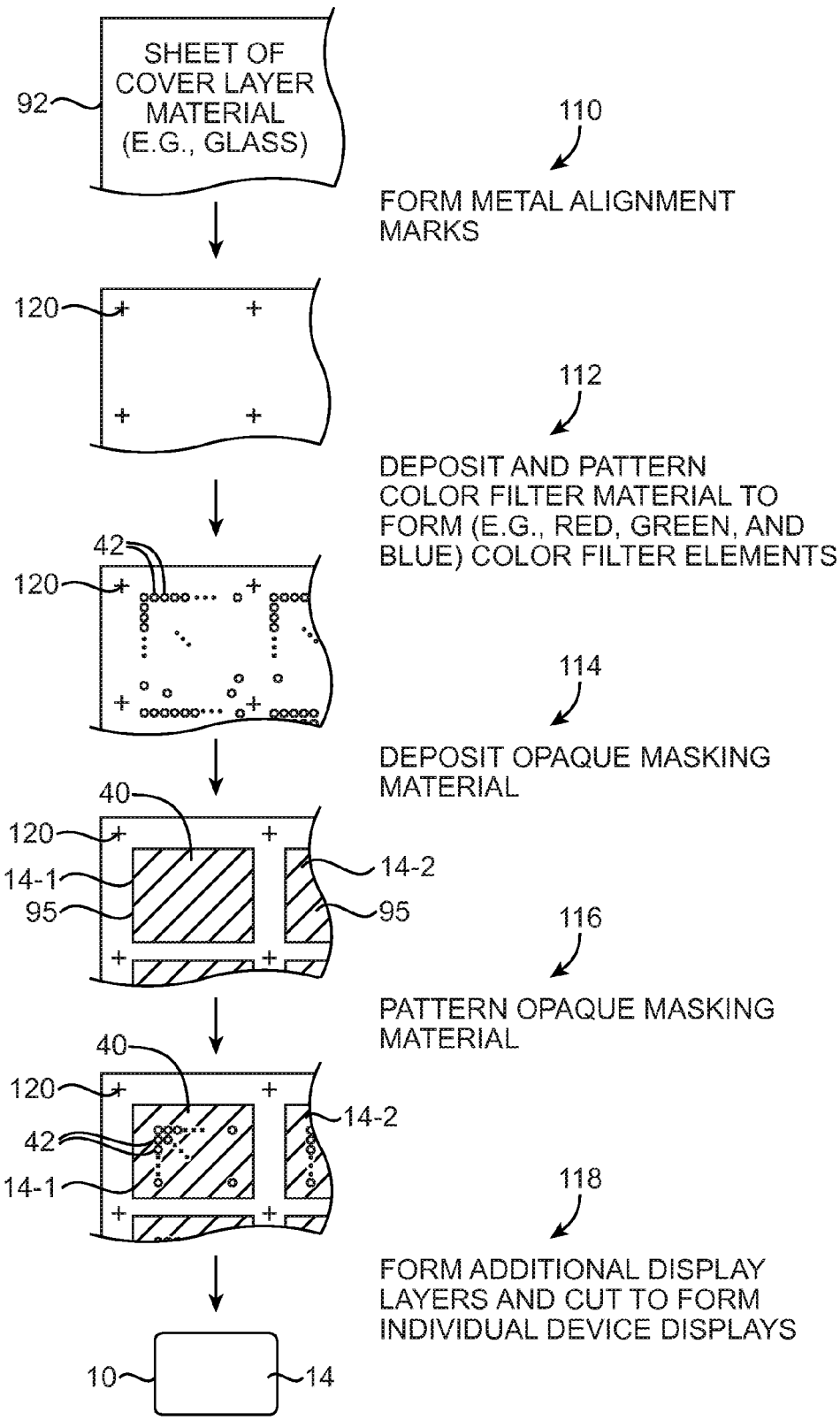
FIG. 8 is a flow chart of illustrative steps involved in forming metal alignment marks, color filter elements, and opaque masking layers on a sheet of cover layer material for forming device displays of the type shown in FIG. 6 in accordance with an embodiment of the present invention.

As another example, the illustrative steps shown in FIG. 8 may be used in forming a display having display layers of the type shown in FIG. 6.

At step 110, metal alignment marks such as alignment marks 120 may be formed on a blank sheet of substrate material such as glass sheet 92 using metallic material having a relatively high reflectance such as metallic material containing chrome or aluminum.

Alignment marks 120 may be used by equipment such as patterning and deposition equipment in forming additional display structures (e.g., color filter elements, opaque masking layers or other display structures) on sheet 92 and/or in cutting portions of sheet 92 to form multiple individual displays 14 for individual devices 10.

At step 112, color filter elements such as red color filter elements, blue color filter elements, and green color filter elements may be formed on sheet 92. Color filter elements 42 may be formed on a common surface of sheet 92 with the metal alignment marks or on an opposing surface of sheet 92 (i.e., a surface that is opposite to the surface on which metal alignment marks 120 are formed). Following formation of color filter elements 42 on sheet 92, sheet 92 may have a multiplicity of color filter arrays for a corresponding multiplicity of displays 14 that are marked off by metal alignment marks 120.

At step 114, opaque masking material 40 may be deposited over color filter elements 42. As shown in FIG. 7, opaque masking material 40 may be deposited (e.g., using slot coating equipment) in discontinuous rectangular deposits 95 of opaque masking material that cover color filter elements 42. Each of discontinuous rectangular deposits 95 may be formed on a portion of sheet 92 to be used for an individual device display (e.g., for displays 14-1, 14-2, etc.). However, this is merely illustrative. Opaque masking material 40 may be deposited in continuous strips or may be deposited over substantially all of the surface of sheet 92 having color filter elements 42.

At step 116, opaque masking material 40 may be patterned (e.g., using patterning equipment such as photolithography equipment) using alignment marks 120 to remove opaque masking material 40 from color filter elements 42 in regions of sheet 92 to be used for active areas AA of each display (e.g., active areas of display 14-1, active areas of display 14-2, etc.).

As shown in FIG. 8, each portion of sheet 92 to be used for a display (e.g., display 14-1, 14-2, etc.) may include uncovered color filter elements 42 and an interposed black matrix in a central portion (e.g., a portion to be used as an active area AA of a display) and opaque masking material over color filter elements in a rectangular ring around the uncovered color filter elements 42 (e.g., in a portion of sheet 92 to be used as an inactive border region IA for that display).

At step 118, additional display layers (e.g., planarization layers, polymer layers such as polyimide layers, liquid crystal layers, thin-film transistor layers, additional substrate layers such as additional glass layers, adhesive layers and other additional display layers) may be formed over patterned opaque masking material 40 and color filter elements 42 using alignment marks 120. Portions of sheet 92 and associated display layers may then be cut to form multiple individual displays 14 having display layers of the type shown in FIG. 6 for corresponding individual devices 10.

Figure 9:
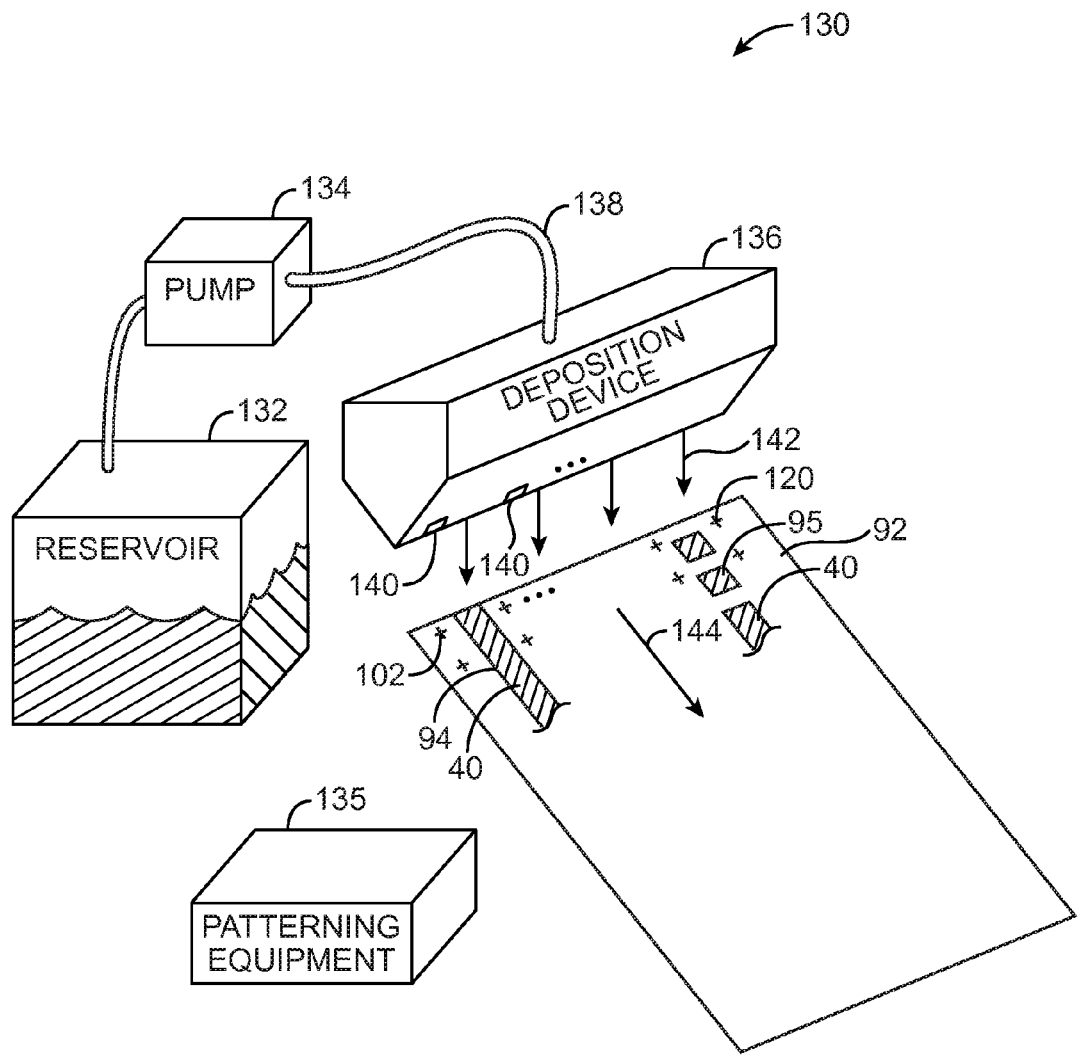
FIG. 9 is a diagram of illustrative deposition and patterning equipment for applying display materials to a sheet of cover layer material for forming device displays in accordance with an embodiment of the present invention.

FIG. 9 shows illustrative deposition and patterning equipment of the type that may be used in performing the deposition and patterning steps of FIGS. 7 and 8. As shown in FIG. 9, deposition and patterning equipment 130 may include deposition equipment such as deposition device 136 for depositing display materials (e.g., color filter material, opaque masking material, planarization material, polymer material, liquid crystal material, polarizing material, anti-reflection coating material, oleophobic material, etc.) onto a substrate such as sheet 92.

Deposition device 136 may include screen printing equipment, spin-on coating equipment, spray coating equipment, physical vapor deposition equipment, chemical vapor deposition equipment, or other suitable deposition equipment. In one suitable example that is sometimes discussed herein as an example, deposition device 136 may be a slot coating device having, for example, a squeegee that applies a layer of material of a desired thickness to sheet 92. Deposition device may, for example, be used to deposit opaque masking material on sheet 92 in direction 142 while moving in direction 144 to form continuous strips 94 or rectangular deposits 95 on sheet 92. Continuous strips 94 may be formed by continuously releasing material 40 while moving device 136 in direction 144. Rectangular deposits 95 may be formed by alternately releasing and stopping material 40 while moving device 136 in direction 144.

Deposition device 136 may be provided with display materials (e.g., color filter materials and opaque masking materials) using pump 134 to deliver material from reservoir 132 through tubes 138. However, this is merely illustrative. If desired, deposition device 136 may be provided with display materials using any suitable means.

Deposition and patterning equipment 130 may include patterning equipment such as patterning equipment 135. Patterning equipment may include photolithographic patterning equipment (e.g., equipment for resist exposure and development), chemical etching equipment, or other suitable equipment for patterning photo-resistive materials such as color filter material and opaque masking material. During patterning operations, patterning equipment 135 may be moved over sheet 92. Patterning equipment 135 and deposition device 136 may use alignment marks such as color alignment marks 102 or metal alignment marks 120 in patterning color filter material and opaque masking material on sheet 92.

Patterning equipment 135 and deposition device 136 may include optical sensing components such as camera sensors 140 for locating and tracking alignment marks 102 and/or 120. Patterning equipment 135 and deposition device 136 may include computing equipment such as microprocessors, memory or other computing equipment for controlling the position of patterning equipment 135 and deposition device 136, for controlling the volume of material released by deposition device 136, for determining a relative position with respect to alignment marks 102 or 120 using camera sensors 140, or for performing other computing tasks associated with depositing and patterning display layers on sheet 92.

Figure 10:
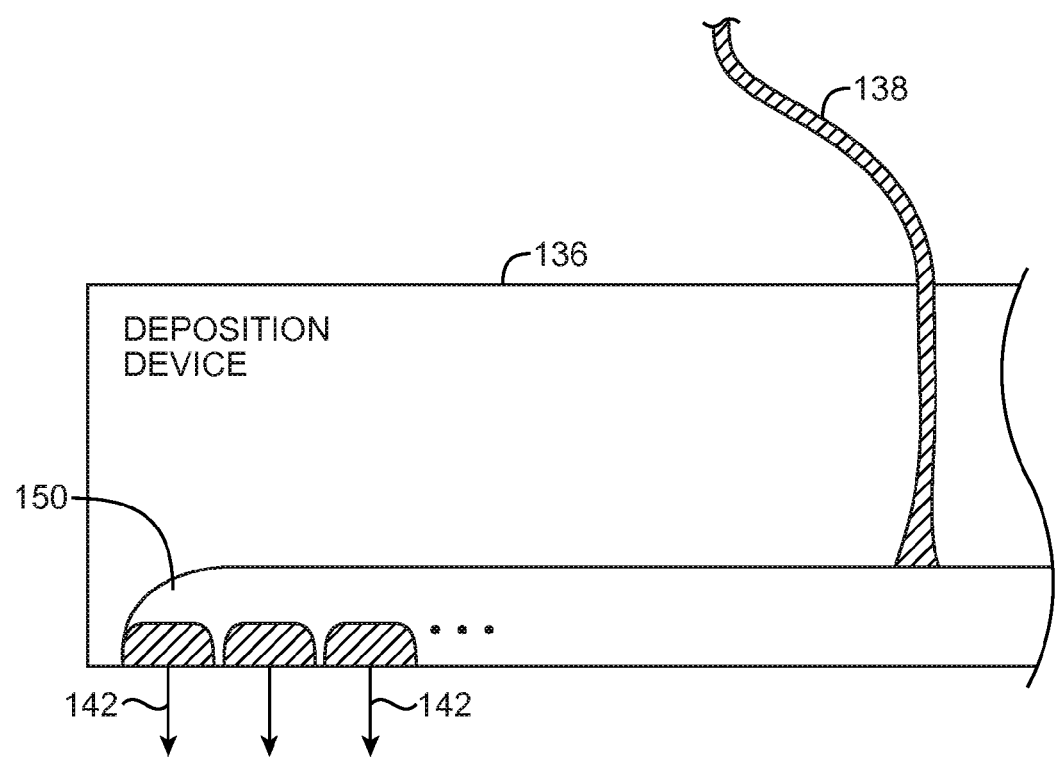
FIG. 10 is a cross-sectional side view of a portion of an illustrative deposition device of the type shown in FIG. 9 in accordance with an embodiment of the present invention.

As shown in FIG. 10, deposition device 136 may include a rigid shim such as shim 150 for guiding opaque masking material 40 onto sheet 92 in direction 142. Shim 150 may be formed from a patterned plastic member having openings such as slots for guiding (for example) opaque masking material 40 from tubes 138 onto sheet 92.

Figure 11:
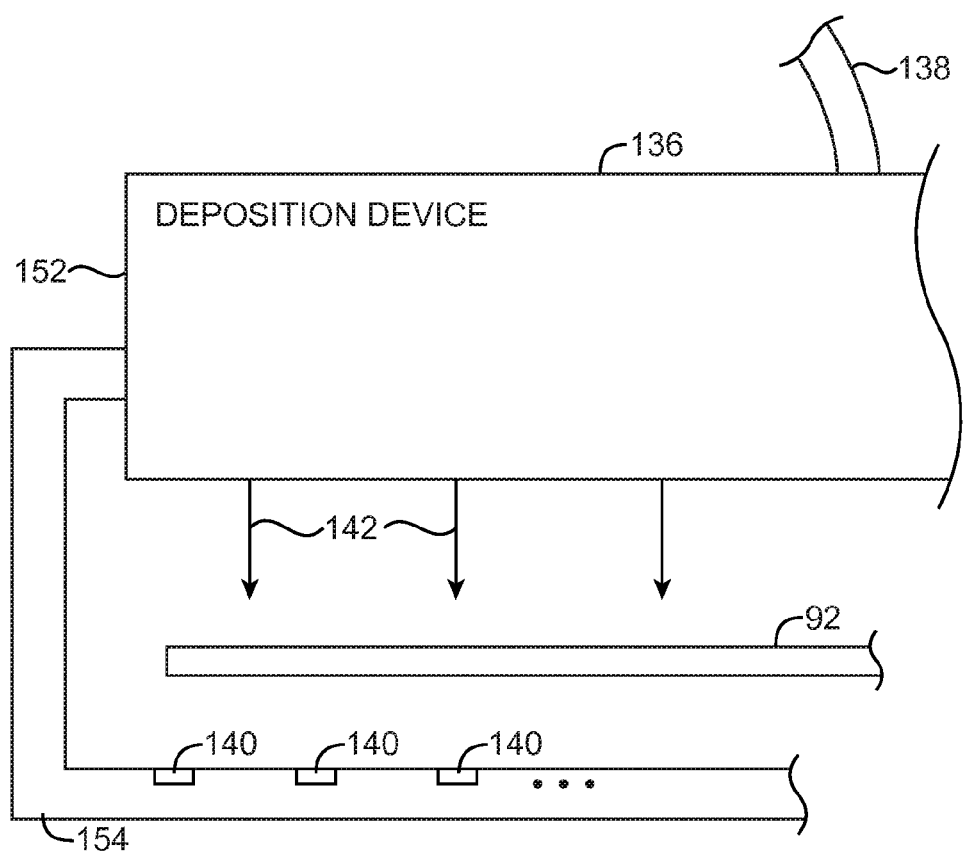
FIG. 11 is a cross-sectional side view of a portion of an illustrative deposition device having an opposing alignment member in accordance with an embodiment of the present invention.

As shown in FIG. 11, deposition device 136 may include a portion such as portion 152 that moves above a first surface of sheet 92 and an additional extended portion such as portion 154 that moves below an opposing second surface of sheet 92 during deposition operations. Portion 152 may be used to deposit display materials onto sheet 92 in direction 142. Portion 154 may include sensors such as camera sensors 140 for locating and tracking alignment marks on sheet 92. Camera sensors 140 may be used for tracking alignment marks on the upper or lower surface of sheet 92 during deposition operations.

Figure 12:
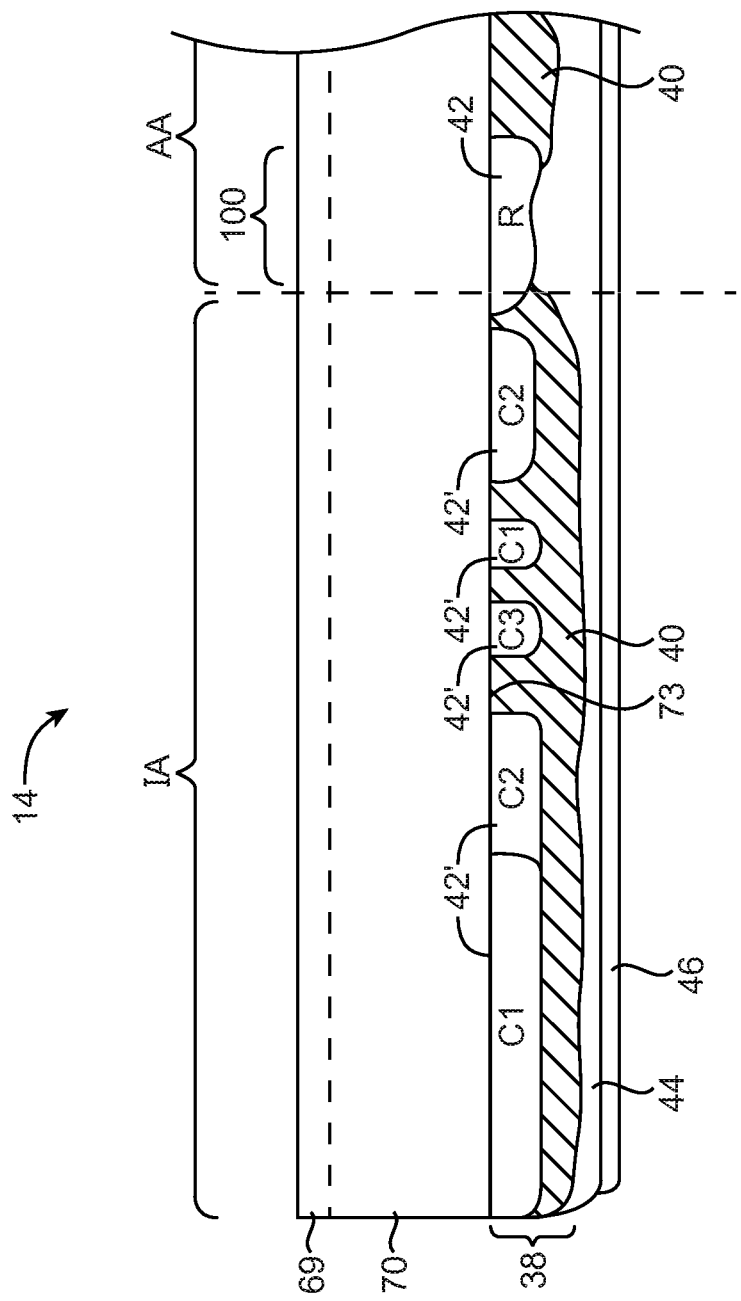
FIG. 12 is cross-sectional side view of a portion of a display having an opaque masking layer over color filter elements in an inactive border region in accordance with an embodiment of the present invention.

If desired, color filter material in inactive region IA may be formed in an arrangement other than a regularly spaced array of color filter elements. As shown in FIG. 12, in inactive region IA, display 14 may include color filters 42' having at least two colors C1 and C2. Display 14 may include color filters 42' having a third color C3. Colors C1, C2, and C3 may be, for example, red, blue, and green. Color filters 42' may be formed adjacent to other color filters 42' without any intervening opaque masking material or may be separated from other color filters 42' by intervening opaque masking material. Color filters 42' may include color filters of two colors, color filters of three colors, or color filters of more than three colors.

Color filters 42' may have a common lateral width along surface 73 or some color filters 42' may have a lateral width along surface 73 that is larger or smaller than the lateral width along surface 73 of other color filters 42'. Color filter elements 42' may be configured (e.g., by adjusting the aperture ratios of color filter elements 42 and color filters 42') to form a color filter layer 38 in inactive region IA having an index of refraction that matches the index of refraction of color filter layer 38 in active region AA. Color filter layer 38 may be configured to provide display 14 with a reflectance and color in inactive region IA that is visually indistinguishable from the reflectance and color of display 14 in active region AA (e.g., when display pixels 100 are turned off).

The foregoing is merely illustrative of the principles of this invention and various modifications can be made by those skilled in the art without departing from the scope and spirit of the invention.

What is claimed is:

1. A display, comprising:
   a first set of color filter elements in an active region of the display;
   a second set of color filter elements in an inactive region of the display;
   opaque masking material, wherein adjacent color filter elements in the first set of color filter elements are separated by the opaque masking material, and wherein adjacent color filter elements in the second set of color filter elements are separated by the opaque masking material; and
   a planarization layer that covers the first and second sets of color filter elements, wherein the planarization layer is in direct contact with the first set of color filter elements, and wherein the planarization layer and the second set of color filter elements are not in direct contact.

2. The display defined in claim 1, wherein the opaque masking material covers the color filter elements in the second set of color filter elements.

3. The display defined in claim 1, wherein the first and second sets of color filter elements are formed on a display substrate, and wherein the display comprises a liquid crystal display.

4. The display defined in claim 1, wherein the inactive region forms a border around the active region of the display.

5. The display defined in claim 1, wherein the inactive region comprises a peripheral region of the display.

6. The display defined in claim 1 further comprising a transparent substrate and a layer of liquid crystal material, wherein the first set of color filter elements and the second set of color filter elements are interposed between the transparent substrate and the layer of liquid crystal material.

7. The display defined in claim 1 wherein the inactive region is devoid of active display pixels.

8. The display defined in claim 1 wherein the opaque masking material comprises openings and wherein each of the openings overlaps a respective one of the color filter elements in the first set of color filter elements.

9. The display defined in claim 3, wherein a color filter element in the second set of color filter elements has first and second opposing sides that are each in direct contact with the opaque masking material.

10. The display defined in claim 9, wherein the color filter element has third and fourth opposing sides, wherein the third side is in direct contact with the display substrate, and wherein the entire fourth side is in direct contact with the opaque masking layer.

11. The display defined in claim 1, wherein at least some of the layer of opaque masking material forms a grid that separates adjacent color filter elements in the first set of color filter elements.

12. A display, comprising:
a transparent substrate layer having a surface;
an array of display pixels configured to display images in an active portion of the display, wherein the active portion of the display is surrounded by an inactive portion of the display;
an array of color filter elements on the surface of the transparent substrate layer, wherein the array of color filter elements includes a first set of color filter elements aligned with the display pixels in the active portion of the display and includes a second set of color filter elements in the inactive portion of the display;
a layer of opaque masking material that covers the color filter elements in the inactive portion of the display, wherein each color filter element of the second set of color filter elements has a first portion that is in direct contact with the surface of the transparent substrate layer and a second portion that is in direct contact with the layer of opaque masking material, and wherein at least some of the layer of opaque masking material forms a grid that separates adjacent color filter elements in the first set of color filter elements; and a planarization layer that covers the first and second sets of color filter elements, wherein the planarization layer is in direct contact with the first set of color filter elements, and wherein the planarization layer and the second set of color filter elements are not in direct contact.

13. The display defined in claim 12 wherein the layer of opaque masking material separates adjacent color filter elements in the first and second sets of color filter elements.

14. The display defined in claim 12, wherein the opaque masking material comprises polymeric material.

15. The display defined in claim 12, further comprising a backlight unit that produces backlight, wherein the backlight passes through color filter elements in the first set of color filter elements.

16. The display defined in claim 12 wherein the inactive portion is located at the periphery of the display and wherein the inactive portion is devoid of active display pixels.

17. The display defined in claim 12 wherein the first and second sets of color filter elements are in direct contact with the surface of the transparent substrate layer.

18. The display defined in claim 17 wherein the color filter elements in the inactive portion of the display are interposed between the transparent substrate layer and the opaque masking material.

19. A display, comprising:
a transparent substrate layer having a surface;
an array of color filter elements on the surface of the transparent substrate layer, wherein the array of color filter elements includes a first set of color filter elements in an active portion of the display and includes a second set of color filter elements in an inactive portion of the display;
a layer of opaque masking material that completely covers the color filter elements in the inactive portion of the display, wherein the color filter elements in the inactive portion of the display are separated by the layer of opaque masking material, and wherein the color filter elements in the inactive portion are interposed between the layer of opaque masking material and the transparent substrate layer; and
a planarization layer that covers the first and second sets of color filter elements, wherein the planarization layer is in direct contact with the first set of color filter elements, and wherein the planarization layer and the second set of color filter elements are not in direct contact.

20. The display defined in claim 19 wherein the first and second sets of color filter elements are in direct contact with the surface of the transparent substrate layer.

21. The display defined in claim 19 wherein the second set of color filter elements comprises first, second, and third color filter elements that are positioned entirely in the inactive portion of the display, wherein the first and second color filter elements are separated by a first distance, and wherein the second and third color filter elements are separated by a second distance that is different than the first distance.

22. The display defined in claim 19, wherein the second set of color filter elements comprises first and second color filter elements that are positioned entirely in the inactive portion of the display, and wherein the first color filter element is in direct contact with the second color filter element.

* * * * *